Dec. 2, 1941.   M. B. A. SCHIER   2,264,410
RADIOGRAPHIC ANGULATING APPARATUS AND METHOD
Filed Aug. 2, 1940   3 Sheets-Sheet 1
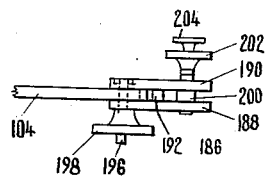
FIG. 1<sup>B</sup>.
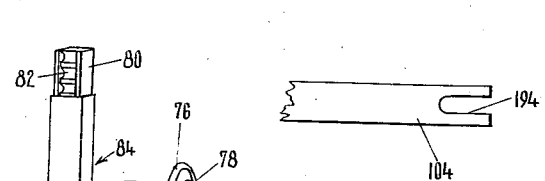
FIG. 1<sup>A</sup>.
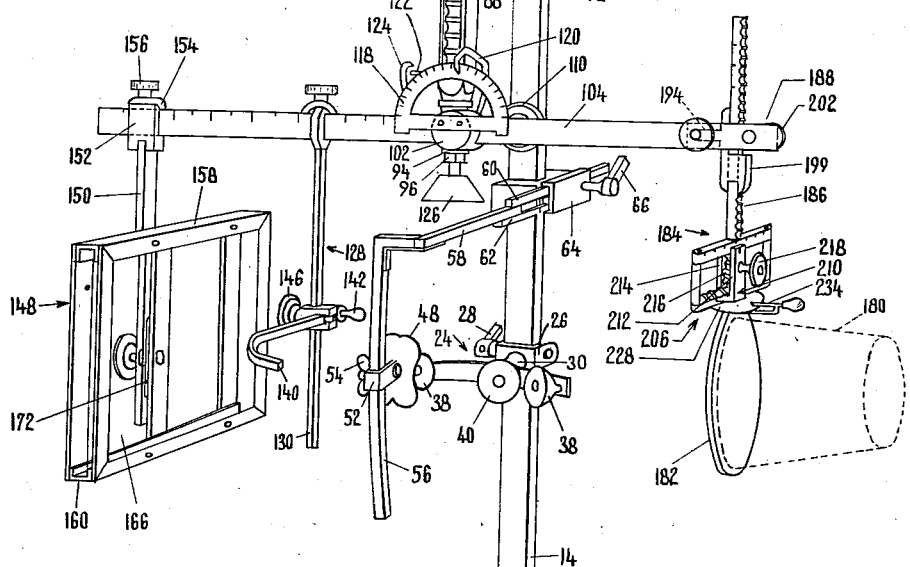
FIG. 1.
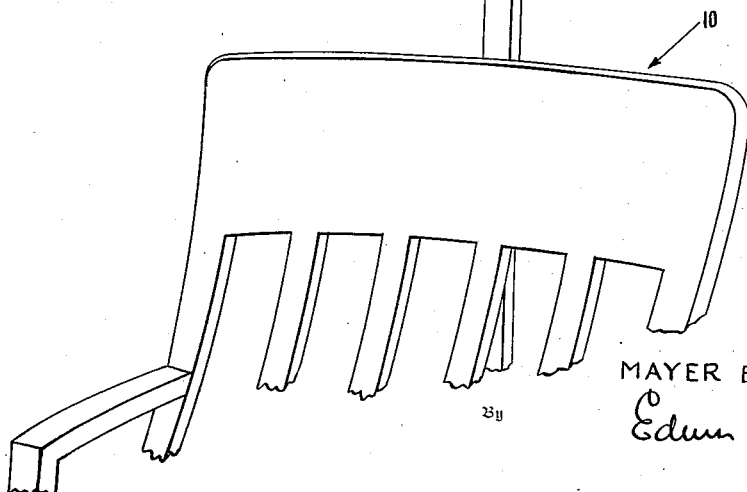
Inventor
MAYER B. A. SCHIER.
By Edwin Leinsohn
Attorney Dec. 2, 1941. M. B. A. SCHIER 2,264,410
RADIOGRAPHIC ANGULATING APPARATUS AND METHOD
Filed Aug. 2, 1940 3 Sheets—Sheet 2
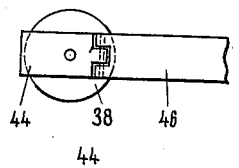
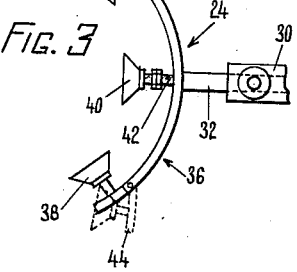
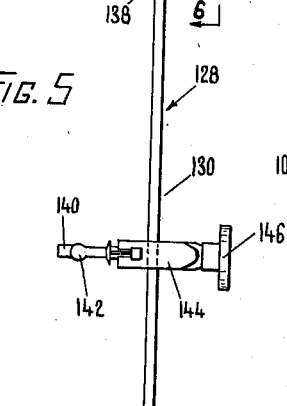
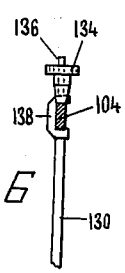
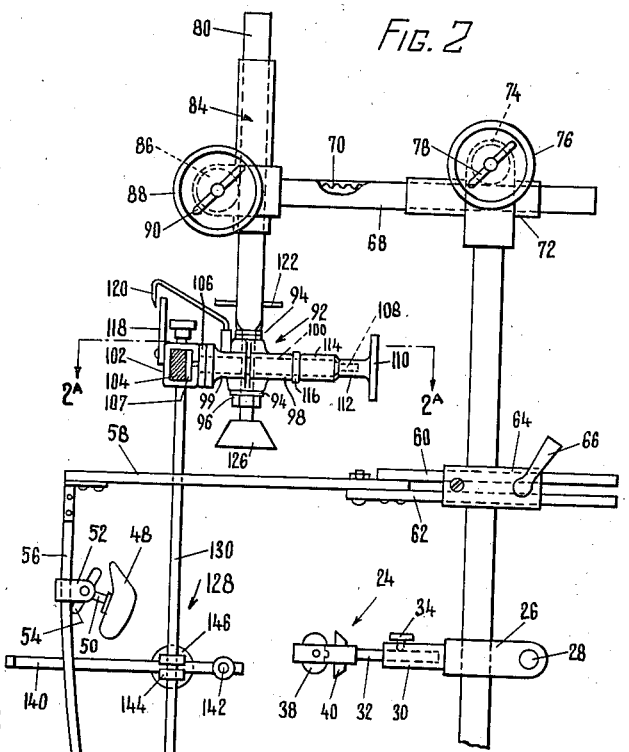
Inventor
MAYER B. A. SCHIER.
Attorney Dec. 2, 1941.　　　M. B. A. SCHIER　　　2,264,410
RADIOGRAPHIC ANGULATING APPARATUS AND METHOD
Filed Aug. 2, 1940　　　3 Sheets-Sheet 3
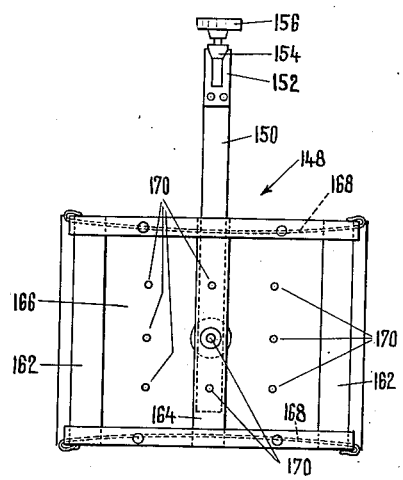
FIG.7.
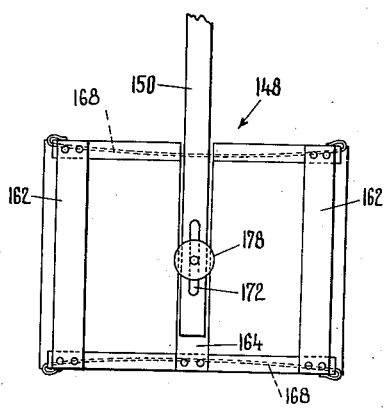
FIG.8.
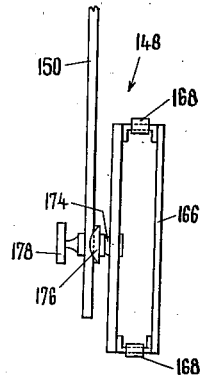
FIG.9.
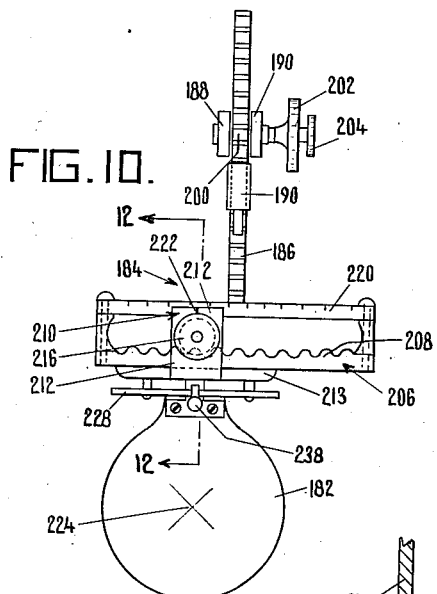
FIG.10.
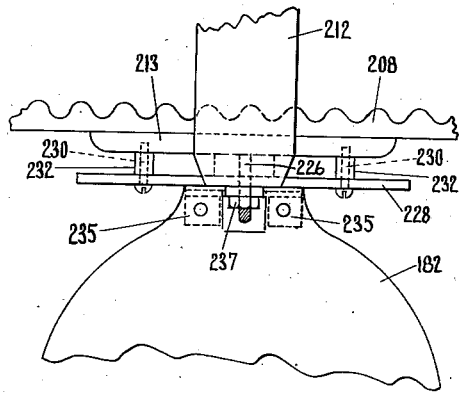
FIG.11.
FIG.12.
Inventor
MAYER B. A. SCHIER.
By Edwin Lewisohn
Attorney Patented Dec. 2, 1941

2,264,410

UNITED STATES PATENT OFFICE 2,264,410

RADIOGRAPHIC ANGULATING APPARATUS AND METHOD

Mayer B. A. Schier, New York, N. Y.

Application August 2, 1940, Serial No. 349,837

18 Claims. (Cl. 250—64)

This invention relates to radiographic angulating apparatus and method, and more particularly to such apparatus and method for use in radiography of the head and parts thereof.

In order to obtain a proper radiograph of the head or parts thereof it is essential that the head be placed in correct relation to an X-ray film and to the projecting beam of the X-ray machine. Heretofore, in the practice of radiography of the head, the positioning of the subject's head has depended largely upon the judgment of the operator, although various methods and devices have been proposed and used with the view of orienting the head in relation to the film and X-ray projector. However such prior art methods or such devices have been wholly or partly unsatisfactory either because of the disadvantages of irregular head-positioning or, where means are provided for positioning the head and fixing the same in predetermined position, because the procedure involves inclination or other positioning of the head displaced from its normal position or relation to the body of the subject. For example, in accordance with one method of radiography of the head, the subject's head is angulated to certain assumed predetermined average inclination of head to film or projector. In accordance with another method the head is moved manually to a position in respect to fixed film and projector relation. In accordance with another method the procedure involves orienting the head by mechanical devices to certain angles assumed to be proper for radiography of the head or parts thereof.

The disadvantages, objections and limitations of these and other prior methods and devices are eliminated in accordance with the present invention, and the accomplishment of this result and the attainment of radiographs characterized by a maximum degree of correctness constitutes the main object of the present invention. A distinguishing feature of my apparatus is the fact that the apparatus is wholly amenable to adjustment to meet the radiographic needs of the patient rather than requiring that the patient be subjected to the needs of the apparatus. More particularly, a prime object of the present invention is the provision of an angulating apparatus in the use of which the subject is placed in a natural position and the apparatus is adjusted in relation to the patient while the latter is in said natural position. The adjustment of the apparatus predetermines the position of the X-ray plate and of the X-ray projection thereto for obtaining the X-ray picture of the part desired.

Another important object of the invention is the provision of an apparatus for determining the position of the X-ray projector automatically in relation to the X-ray plate in such manner that when the plate is positioned in proper relation to the part to be radiographed the central X-ray beam is projected centrally through the part to be radiographed and at right angles to said plate.

A further object of the invention is to provide an angulating apparatus of the character described which can be used for properly positioning the tube of the X-ray projector for taking stereoscopic X-ray pictures.

The apparatus for and method of obtaining radiographs of the head and parts thereof pursuant to this invention is particularly advantageous in respect to an important phase of radiography, namely, radiography of the tempero-mandibular joint or articulation. Correct radiographs of the tempero-mandibular joint are of the utmost importance in the practice of medicine, surgery and dentistry and is essential to the otologist, laryngologist, pharyngologist, orthodontist, prosthodontist, as well as to the general practitioner of dentistry and to others, because no proper understanding of tempero-mandibular function or disfunction is possible unless an accurate and representative X-ray picture can be taken of the joint showing the juxtaposition of the head of the condyle to the glenoid fossa or cavity, and its pathology as may be found in the particular joint of the particular patient.

Radiography of the tempero-mandibular joint has been beset by innumerable difficulties, because of anatomical form, superimposition of deep and dense structures, and the marked variability in anatomy both as to condyle head form and its relationship to the glenoid fossa or cavity. In the main, all efforts have been directed to obtain radiographs by mean averages of position between film or plate and the ray of incidence, by the use of average angles for the head and joint proper, the glenoid cavity form, or such as may be desired by a particular operator. Such methods are, however, necessarily incapable of producing correct radiographs. No two individuals have the same angled heads to fossa, and in fact there is variability in the two heads and fossas of the same individual. Anatomical studies of the cadaver and particularly of the dried and prepared skull reveals the marked variations in joint form and relationships.

In a general way, the condyle head runs upward and backward, with variations as age progresses. The glenoid cavity is a rough congruency widening out from internal aspects to the outer lateral portions, with variations of its path or eminentia influenced by age and other factors, as in the condyle head.

As a result of considerable study and research with respect to anatomical forms or relationships for the purpose of ascertaining the general direction of the condyle head with the object of determining a method likely to produce proper radiographs, I have discovered three important landmarks or points of the head which provide an important basis for correct radiography of the tempero-mandibular joint. One point is the gonion, which is at the corner of the angle of the mandible; the second is the point at the union of the external oblique line and the lower border of the mandible; and the third point or landmark is the high spot of the zygoma or zygomatic process. More particularly, in accordance with my method I utilize these three points for determining the plane in which the X-ray film should lie in taking an X-ray picture of the tempero-mandibular joint. Further I have discovered that a line perpendicular to said plane is parallel to a line coincident with the major line of the condyle head.

In utilizing this principle in the art of radiography of the tempero-mandibular joint, the X-ray film or plate is placed in the correct plane, determined by the three points described above, and the X-ray beam is projected through the tempero-mandibular joint centrally thereof and at right angles to the X-ray film or plate. In accordance with this method there is obtained in comparison with the prior art methods a truer picture of the relationship of the condyle head and its summit to the eminentia articularis and the articular tubercle. This is in contrast to radiographs which of necessity in technique are representative of relationship of a false angle of the head or summit of the condyle which is in a different plane and angle to that of the outer surface of the bordering fossa or zygomatic process, which is the articular tubercle and not the eminentia.

A method based upon the above described principle and the provision of an angulating apparatus which is highly useful and advantageous in the practice of said method constitute important objects of the present invention.

The apparatus embodying this invention provides means for positioning the plate or film in conformity with the above mentioned landmarks, in aligning the head of the condyle so that it is practically at right angles to the film plane, with provision for directing the central rays to be projected in line with the condyle head and its adnexa, or the tempero-mandibular articulation, in automatic and scientific approach, hitherto unavailable.

The above objects of the invention and other objects and advantages thereof will be more fully understood from the following description considered in connection with the accompanying drawings.

In the drawings:

Fig. 1 is a perspective view of the angulating apparatus embodying the present invention;

Figs. 1A and 1B are detail views of parts of the apparatus;

Fig. 2 is a side view of the apparatus illustrated in Fig. 1 with parts omitted for the sake of clearness of illustration of other parts;

Fig. 2a is a detail sectional view on the line 2a—2a of Fig. 2;

Fig. 3 is a top plan view of the head rest;

Fig. 4 is a fragmentary detail view of the head rest, in front elevation;

Fig. 5 is a rear view of the aligner and of part of the supporting bar to which it is removably attached;

Fig. 6 is a sectional view on the line 6—6 of Fig. 5;

Fig. 7 is a view in elevation of one side of the film plate holder;

Fig. 8 is a view in elevation of the other side of the film holder;

Fig. 9 is an end view in elevation of the film holder;

Fig. 10 is a side view in elevation of the means for positioning the tube of the X-ray projector;

Fig. 11 is a fragmentary view, on a larger scale, of part of the positioning means illustrated in Fig. 10;

Fig. 12 is a sectional view on the line 12—12 of Fig. 10.

Referring now to the drawings in detail, the radiographic angulating apparatus of the present invention is, as here shown, supported on the back of a chair 10 on which the patient or subject to be radiographed is seated, said chair being provided with a vertically adjustable seat 12 as illustrated in Fig. 2. More particularly, a vertical post or main support 14 is secured for vertical adjustment in clamping sockets 16 and 18 fixed to the back of the chair by brackets 20 and 21, respectively, the latter being properly dimensioned in relation to the chair whereby sockets 16 and 18 are in vertical alignment. Said clamping sockets 16 and 18 are provided with clamping bolts 22 for releasably securing post 14 in adjusted position. Said post is preferably constituted by a metal tube of square or other non-circular cross sections and slidably fit in sockets 16 and 18.

A movable head rest 24 is secured to post 14 and is adjustable longitudinally thereof, for which purpose said head rest is secured to and projects forwardly of a clamping member 26 provided with a clamping bolt or screw 28 for releasably securing said member in adjusted position on post 14. Member 26 is provided with a socket portion 30 in which a rod 32 forming part of the head rest is adjustably secured by a set screw 34. A bow or arcuate strap 36 is carried by rod 32 and is provided at its ends with cups 38, of soft rubber or other suitable material, for engaging the opposite sides, respectively, of the patient's head. Said head rest also comprises a central cup 40 which is carried by a threaded rod 42 and removably secured to rod 32. Central cup 40 is preferably removed when the head rest is used in taking an anterior posterior X-ray of the head, and for that purpose provision is made in the head rest for positioning cups 38 so that they are disposed for engagement with the same side of the subject's head. Accordingly, as here shown, said cups are carried by hinged sections 44, which are pivotally secured to the central section 46 of head rest member 36. The position of cups 38 when the apparatus is used for taking an anterior posterior X-ray picture is illustrated in dotted lines in Fig. 3, it being understood that central cup 40 may be removed from the head rest when said picture is being taken, or if desired, central cup 40 can be entirely omitted from the head rest.

When the patient is seated on the chair with his or her head in engagement with head rest 24, the head of the patient is held in fixed position by a fitting 48 which engages and conforms to the bridge of the nose and glabella area. When an anterior posterior X-ray picture is taken fitting 48 can be replaced by a flat element adapted to engage the side of the head opposite to that engaged by cups 38. Fitting 48 is carried by a pin 50 which is pivotally and adjustably secured in a clamping bracket 52 provided with a securing bolt or screw 54. Bracket 52 is adjustable longitudinally of a curved bar 56 which is secured to and depends from a sagital-plane arm 58. Said arm is rigidly secured at its rear end to members 60 and 62 which are slidable in a supporting clamping bracket 64 whereby arm 58 can be moved toward and away from post 14 to position the fitting 48 properly in engagement with the patient's nose. Clamping bracket 64 is adjustable longitudinally of post 14 and is provided with a clamping screw 66 for releasably securing the same in adjusted position for obtaining a sagital alignment and fixation of the patient's head.

A horizontal bar 68 is adjustably mounted on the upper end of post 14 for movement in a horizontal plane at right angles to the vertical plane of post 14. Said bar 68 is provided with a rack 70 and is slidable in a guide-housing 72 secured to bar 14. Said housing contains a gear 74 which meshes with rack 70 and which is rotated by a hand wheel 76 fixed to the shaft of said gear in non-rotary relation therewith but movable longitudinally of said shaft whereby a clamping nut 78 threaded on the end of the gear shaft presses one side of wheel 76 against an adjacent surface of housing 72 for holding the gear and bar 68 releasably in adjusted position.

A vertical bar 80 provided with a rack 82 is carried by horizontal bar 68 for movement at right angles to said last mentioned bar. For this purpose bar 68 is provided with a guide-housing 84 in which bar 80 is movable and by which said bar is guided for movement in a plane at right angles to bar 68. Said guide-housing 84 has a gear 86 mounted for rotation therein in engagement with rack 82, the shaft on said gear being provided with a hand wheel 88 and a releasable clamping nut 90 which functions in the same way as hand wheel 76 and clamping nut 78, respectively.

The lower end of bar 80 is of circular cross-section and carries a rotary support and clamping member 92, said lower end of bar 80 and member 92 forming part of a universal joint. Said member 92 is in the form of a split bracket having a rotary bearing on the circular lower end portion of bar 80 and is held against vertical movement between washers 94 and by a nut 96. Member 92 is provided with fixed tubular portions 98 and 99 which provide a bearing and guide-way for a rod 100. A guide and support 102 for a bar 104 is carried by the forward end of a rod 100, said rod and associated parts forming another part of the universal joint. The forward end of rod 100 is fixed to part 102. A washer 106 is disposed between the end of tubular bearing part 99 and the adjacent surface of bearing guide and supporting member 102. A washer 107 is disposed in part 102 in position to engage bar 104 and has projections 109 which pass through openings in part 102 and engage washer 106. The rear end portion 108 of rod 100 is threaded and is engaged by a clamping wheel 110 having an axially extending portion 112 which is internally screw-threaded and receives threaded end portion 108 of rod 100. A bushing or spacer 114 is movable on rod 100 in position to engage clamping washer 116. It will be understood that when clamping wheel 110 is loosened the universal joint is adjustable to position bar 104 to any desired position with respect to horizontal and vertical planes, member 92 being movable about a vertical axis and member 102 being movable about a horizontal axis. It will be understood further that when wheel 110 is tightened member 92 is clamped in fixed position on the cooperating end portion of bar 80 and rod 100 is prevented from turning by the engagement of inner end of part 112 with the adjacent end of bushing 114 which is clamped against the adjacent end of washer 116 and part 98. It will be understood also that when hand wheel 110 is tightened part 102 is clamped in fixed position, as is also bar 104, the projections 109 of washer 107 engaging washer 106 and the surface of said washer 107 forcing one side of bar 104 against the adjacent surface of the adjacent side of guide and support 102.

Thus bar 104 is mounted for turning movement in two planes at right angles to each other. Provision is made for indicating the angular position of said bar 104 in each of said planes. The angular position of bar 104 in a vertical plane about a horizontal axis, i. e., the axis of rod 100, is indicated by a dial 118 having a scale graduated in degrees, said dial 118 being fixed to and turnable with member 102, and an index pointer 120 being fixed to member 92. For indicating the movement of bar 104 about a vertical axis a dial 122, similar to dial 118, is fixed to bar 80 and an index pointer 124 is fixed to and is rotatable with member 92 about said vertical axis and is movable in relation to dial 122 for indicating the angular position of bar 104 in a horizontal plane. The lower end of bar 80 is provided with a centering cup 126 which engages the top of the patient's head in the fixed position of the latter when the bar 80 is lowered, providing for subsequent correct positioning of bar 104 pursuant to the readings on the dials 118 and 122.

An aligner 128 is carried by bar 104 and depends from the latter, said aligner being provided for positioning the patient or subject in such horizontal plane or to such standard or reference line as the operator may desire, as for example, intermeatal fixation, Frankfort, Camper's or lower mandibular border lines. Said aligner comprises a rod 130 removably and adjustably secured to bar 104 by a clamping member 132 engaged by a clamping nut 134 threaded on the upper end 136 of rod 130. Said rod has an open-side head or guide portion 138 which slidably engages bar 104 for removably supporting the aligner thereon. When clamping nut 134 is tightened clamping member 132 engages the top edge of bar 104 for securing rod 130 in adjusted position longitudinally of said bar which, as illustrated in Fig. 1, is provided with a scale for indicating the position of the aligner. The aligner carries a horizontally curved bar 140 and a tragus or ear hole pointer 142 mounted on and movable with a clamping member 144 releasably locked in adjusted position longitudinally of rod 130 by a clamping wheel 146. When the patient has been aligned the aligner 130 is removed from bar 104, after noting the reading of the aligner head 138 on the scale of bar 104 so that the position of the aligner can be duplicated at any subsequent seating of the patient or subject. Accordingly by recording the readings of the dials 118 and 122 and the reading of the aligner scale on bar 104, a patient or subject may be re-positioned accurately for any subsequent radiography.

A holder 148 for the X-ray plate or film is carried by a supporting member or rod 150 which has a fitting 152 on its upper end in slidable engagement with bar 104 and supported by the latter in adjustable position thereon. Fitting 152 is provided with a clamping part 154 which engages the top edge of bar 104 for securing supporting member 150 in fixed position longitudinally of the bar, a clamping screw 156 being provided for tightening and loosening clamping part 154. It will be understood that bar 150 is held by fitting 152 against movement in respect to bar 104 other than movement longitudinally thereof. Holder 148 is clearly illustrated in Figs. 7 to 9 as well as in Fig. 1. As here shown, said holder comprises upper and lower U-shaped members 158 and 160, respectively, connected at the back of the holder by straps 162 and by a center strap 164. The front of the holder is provided with a translucent pane 166, of glass or of a glass substitute. Flat spring members 168 are arranged in the upper and lower holder members 158 and 160 for engaging the cassette (not shown) at the opposite side edges thereof for releasably holding said cassette in position in the holder.

Transparent pane 166 which constitutes the plane determinant for the X-ray film or plate is provided with a plurality of center markings 170 indicating the center of the complete field of the X-ray plate or film contained in the cassette and the centers of its divisional surface, for example, divisions in halves and quarters. Center markings for other divisional surfaces, for example, sixths and twelfths, can be provided, if desired. This arrangement permits not only the taking of centered radiographs on the entire plate or film but any number of sequential radiographs of a confined area, without disturbing the apparatus, its plane angle or relationship of film and incident ray to area involved, and without disturbing the patient or subject. It will be understood that when less than the entire film or plate surface is to be exposed to the X-ray beam, plates of sheet lead with openings corresponding to the area of the plate to be exposed can be selectively positioned and mounted on or in the holder between the X-ray plate or film and the X-ray beam in order to permit only such exposures as are desired.

Holder 148 is adjustably secured to arm 150 for movement longitudinally of said arm, that is, upwardly and downwardly thereof and also for turning movement in a vertical plane. For this purpose the lower end of supporting member 150 is provided with a longitudinally extending slot 172 through which a stud 174 projects, said stud being fixed to center strap 164 of the holder. Stud 174 has a rotary bearing in the slotted end of member 150 in order to permit turning movement of the holder in its own plane. A clamping member 176 is carried by stud 174 and engages one side of member 150. A clamping nut 178 is threaded on the outer end of stud 174 and engages the opposite side of supporting member 150 whereby to releasably secure holder 148 in adjusted position.

Provision is made for positioning the X-ray projector in correct relation to the X-ray plate or film when the latter is mounted in holder 148. In Fig. 1 the tube 180 of the X-ray projector is illustrated more or less diagrammatically in dotted lines, it being understood that said tube or cone forms part of the projector head which conventionally is supported for universal movement and also for up and down movement. The positioning means comprises a planar member 182 of glass or its substitute. Said translucent positioning member 182 is mounted for vertical movement in two directions and for horizontal movement in two directions in a plane parallel to the plane of the X-ray film or plate, or to the vertical plane of the plane-determinant member 166 of holder 148. For this purpose member 182 is carried by an adjustable supporting device 184. Said device 184 comprises a rack bar 186 mounted for movement in a vertical plane transversely of bar 104 and at right angles to the latter. Said bar is supported for this movement by a fitting including parallel side members 188 and 190 removably disposed at opposite sides of bar 104 as clearly illustrated in Fig. 1B. Said plates 188 and 190 are connected in fixed spaced relation by a pin 192 which is received within a slot 194 in the end of bar 104. A headed pin 196 passes through plates 188 and 190 and through slot 194 and is provided with a clamping nut 198 for clamping plates 188 and 190 against opposite sides, respectively, of bar 104. Pins 192 and 196 thus hold the fitting against turning movement in relation to bar 104.

A guide 199 in fixed relation to members 188 and 190 is provided for guiding rack bar 186 and for preventing turning movement of said rack bar, confine the movement of said bar to a plane parallel to the plane of the X-ray film or plate in holder 148. A gear 200 mounted for rotation between members 188 and 190 engages the rack of bar 186 for moving the latter, said gear being rotated by a hand wheel 202 mounted on the shaft of the gear in non-rotary relation thereto. A clamping nut 204 engages a threaded end of the shaft of the gear and is engageable with the outer surface of hand wheel 202 for releasably securing the latter against turning movement whereby to releasably secure rack bar 186 in fixed vertical position. A rack member 206, provided with a horizontally extending rack 208, is rigidly fixed to the lower end of rack bar 186. A movable gear mounting member 210 having spaced side plates 212, 214 which engage opposite sides, respectively, of horizontal rack member 206 is arranged for movement longitudinally of said rack member and is supported in said relation by a gear 216 which meshes with rack 208. Member 210 is guided for longitudinal movement and is prevented against turning movement by a bottom guide member 213 which slidably engages the bottom edge of rack 208. The shaft of gear 216 is journalled for rotation in the opposite side members 212 and 214, and the outer end of said shaft is provided with a hand wheel 218 by which said gear is rotated. Rack member 206 has an upper bar 220 provided with calibrated scale markings corresponding to the markings 170 on the translucent plate or pane 166 of holder 148. Plate 212 is provided with a center marking 222 for positioning member 182 horizontally in relation to the markings on bar 220 indicating the central markings 170 on member 166 from side to side. Rack bar 186 is provided with vertical calibrated markings for positioning member 182 vertically in relation to any center marking 170 of the plane-determinant member 166. The central ray or ray of incidence from cone 180 will travel through center point 224 of member 182, through the area to be radiographed, and to the selected center point 170 on the plate-holder member 166, this being accomplished by the vertical and lateral adjustment of member 182 by racks 186 and 208.

In the apparatus as thus far described, it will be observed that X-ray projector positioning member 182 is at all times parallel to that of the plane-determinant constituted by the pane or cover 166 of the plate holder 148 and it will be understood that said member 182 is at all times parallel to the plane of the X-ray plate or film which is mounted in said holder. It will be observed further that positioning member 182 is moved automatically to various positions in respect to a horizontal plane and a vertical plane corresponding to the various positions, respectively, to which the plane-determinant is moved during the adjustment of bar 104. Since, however, it may be desired to take stereoscopic X-ray pictures, provision is made for adjusting positioning member 182 angularly for such purpose. Member 182 is therefore mounted for movement about a vertical axis by means of a pin 226 secured to dial member 228. The dial member 228 is fixed to member 213 by screws 230 and spacing members 232 to guide member 213 and projects laterally therefrom. A bracket 233 is fixed to member 182 by parts 235. A nut 237 threaded on pin 226 engages part 236 of the bracket for pivotally supporting the same. An indexing pointer 234 is movable with positioning member 182 and for that purpose is fixed to part 236 of bracket 233. Said part 236 of the bracket is provided with a handle 238 for turning said member 182 about its vertical axis. Dial 228 is calibrated with scale indications to designate the correct angular position of member 182 about its vertical axis, said indications being related to the distance between member 182 and the X-ray plate in holder 148, so that member 182, when positioned in accordance with the dial markings, will determine the position of projector 180 to provide the proper angulation of the central beam through the area to be radiographed to a predetermined point on the holder.

In the usual operation of the apparatus for taking an X-ray picture of the patient's head or a part thereof, particularly for radiographing the tempero-mandibular joint, the patient is seated in the chair 10 in a comfortable position facing forwardly, the head of the patent resting against the head rest 4. The sagital-arm 58 is placed in position with the anterior fitting 48 lightly in position against the glabella and nose bridge, thus to align the patient sagitally. Bar 80 is then racked down until the centering cup 126 touches the top of the patient's head. The aligner 128 is used to obtain horizontal positioning of the patient's head to the Frankfort plane, Camper's line, intermeatal position or any other horizontal determinant as described above, and then the sagital-arm is moved back so that the anterior fitting 48 more firmly engages the patient's glabella and nose bridge, in which position arm 58 is tightened by turning clamp screw 66. In using the aligner 128, the curved bar 140 is placed adjacent the side of the patient's head, the latter being positioned sagitally with the aid of arm 58, and the patient's head is moved in a vertical plane until a line extending between pointer 142 and the free end of said bar 140 extends along the chosen reference line of the patient's head. A reading is taken of the aligner 128 on the bar 104, it being understood that said bar is during the procedure thus far described in zero position, i. e., in horizontal position. Should it be necessary at some subsequent time to take another similar X-ray of the same patient, the record of said reading and a record of the reference line with respect to which the patient's head was positioned with the aid of aligner 128 make it possible to place the head at such subsequent time in precisely the same position it was when the first X-ray was taken. After the reading of the aligner 128 is taken said aligner is removed. In the further procedure, the locking wheel 110 is released whereby to permit free movement of bar 104 and the parts carried thereby. Holder 148 is adjusted so that the plane-determinant member 166 is moved close to the face and to approximately the three plane-determining points hereinbefore described, and when thus positioned, locking member 110 is tightened to fix the position of bar 104 and of the holder carried thereby, the other adjusting portions associated with the holder being also tightened after the center of the X-ray plate or a divisional part thereof is aligned with the center of the area to be radiographed. Readings are taken on the several dials. Member 182 is positioned by turning gears 202 and 218 so that the center marking 224 is in alignment with the center marking either for the entire X-ray plate or for a predetermined portion or division part thereof. As stated above, all movements of positioning member 182 are in a plane parallel to the plane of the plane-determinant member 166. The tube 180 of the X-ray projector is then brought into juxtaposition with respect to the adjacent surface of positioning member 182, as illustrated in dotted lines in Fig. 1, and the X-ray picture is then taken by operating the X-ray projector, tube 180 being properly positioned by the engagement with the adjacent surface of positioned member 182, or lying in a plane close to and parallel with said surface. The X-ray beam is thus projected through the center of the area of which the X-ray picture is to be taken and at right angles to the plane of the X-ray film or plate. Similarly any and all points or divisions of an X-ray plate or film may be made and central and plane relationship between the tube 180 of the X-ray projector and the X-ray plate and film and interposed anatomical area maintained accurately and properly throughout the process of taking the picture.

In stereoscopic radiography the procedure is substantially the same as above, except that after the positioning member 182 is positioned automatically during the procedure of positioning plane-determinant member 166 as fixed by the three points hereinbefore referred to. Said positioning member is first moved either to the left or to the right to a point on bar 220 which is at a distance from the center marking on upper bar 220 corresponding to one-half the pupillary distance, following which member 182 is turned about its vertical axis to the correct angular position as indicated by the marking on the dial 228 for providing the proper angulation in respect to the distance between member 182 and the X-ray plate in holder 148 for obtaining the stereoscopic projection on one side. Then member 182 is thereafter moved in the opposite direction to a point one-half the pupillary distance from the center marking on upper bar 220, following which member 182 is turned about its vertical axis to a similar point on dial 228 in the opposite direction for determining the position of member 182 for the companion stereoscopic projection. The two companion projections of the X-ray beam can be directed to different points on the same plate, the latter being moved in the holder to align said points of the plate centrally of the area which is radiographed. The relation of movement and degree of angle to movement of positioning member 182 about its vertical axis is such that the normal pupillary distance of two and one-half inches is maintained and the perspective corrected to the distance between tube and area to be radiographed and the X-ray film or plate.

While I have shown and described the preferred apparatus and method of the present invention, it will be understood that said apparatus and method are susceptible of various changes, particularly as to details of construction of the apparatus. While I have described the use of the apparatus more particularly in reference to the taking of X-ray pictures of the tempero-mandibular joint, it will be understood that the apparatus is useful generally in taking X-ray pictures of the head or parts thereof in proper radiographic alignment, the X-ray beam being directed centrally through any area of the head at right angles to the X-ray plate or to a predetermined point on an X-ray plate. Accordingly, I do not wish to be limited to the apparatus or method as herein specifically described except to the extent which may be required by the scope of the appended claims.

Having thus described my invention, what I claim and desire to secure by Letters Patent is:

1. Radiographic angulating apparatus comprising means for releasably holding the subject's head in fixed position, means for holding an X-ray plate in position in relation to the subject's head, said holding means being mounted for pivotal movement to various positions about either or both of two axes at right angles to each other, and means for determining the position of an X-ray projector in relation to the X-ray plate carried by the holder and in relation to the subject's head, and a connection between said holding means and said position-determining means for moving the latter to various positions corresponding to said positions, respectively, of said holding means.

2. Radiographic apparatus comprising a holder for an X-ray plate or film, means for supporting said holder and for adjusting the same in relation to the part to be radiographed, said means comprising a member mounted for pivotal movement about two axes at right angles to each other, an adjustable member for determining the position of an X-ray projector in relation to said plate and to the part to be radiographed, said position-determining member being movable with said holder whereby said holder and position-determining member are simultaneously adjustable in relation to the part to be radiographed, and means for adjusting said position-determining member individually in relation to a predetermined point on the plate in said holder.

3. Radiographic angulating apparatus comprising means for releasably holding the subject's head in fixed position, a support including a member movable about two axes at right angles to each other, an X-ray plate or film holder carried by said member and adjustable thereby to various positions upon movement of said member, and means carried by said member determining the position of an X-ray projector in relation to the X-ray plate and to the subject's head and movable by said member to various positions corresponding to the positions of the X-ray plate in said various positions, respectively, of said holder, said position-determining means comprising a planar member parallel to the plane of the X-ray film or plate in said holder.

4. Radiographic angulating apparatus comprising means for releasably holding the subject's head in fixed position, a support including a member mounted for turning movement about a horizontal axis and about a vertical axis, an X-ray plate or film holder carried by said member and adjustable thereby to various positions upon movement of said member, means carried by said member for determining the position of an X-ray projector in relation to the X-ray plate and to the subject's head and movable by said member to various positions corresponding to the positions of the X-ray plate in said various positions, respectively, of said holder, and means mounting said position-determining means for movement in two directions in a plane parallel to the plane of the X-ray plate or film carried by said holder.

5. Radiographic angulating apparatus comprising means for releasably holding the subject's head in fixed position, a support including a member mounted for turning movement about a horizontal axis and about a vertical axis, an X-ray plate or film holder carried by said member and adjustable thereby to various positions upon movement of said member, means carried by said member for determining the position of an X-ray projector in relation to the X-ray plate and to the subject's head and movable by said member to various positions corresponding to the positions of the X-ray plate in said various positions, respectively, of said holder, and means mounting said position-determining means for movement about an axis parallel to said vertical axis.

6. Radiographic angulating apparatus comprising means for releasably holding the subject's head in fixed position, a support including a member mounted for turning movement about a horizontal axis and about a vertical axis, an X-ray plate or film holder carried by said member and adjustable thereby to various positions upon movement of said member, means for determining the position of an X-ray projector in relation to the X-ray plate and to the subject's head, said position-determining means being adjustable, under the control of said member, to various positions corresponding to the positions of the X-ray plate in said various positions, respectively, of said holder, and means mounting said position-determining means for movement horizontally and vertically.

7. Radiographic angulating apparatus comprising means for releasably holding the subject's head in fixed position, a support including a member mounted for turning movement about a horizontal axis and about a vertical axis, an X-ray plate or film holder carried by said member and adjustable thereby to various positions upon movement of said member, means for determining the position of an X-ray projector in relation to the X-ray plate and to the subject's head and movable by said member to various positions corresponding to the positions of the X-ray plate in said various positions, respectively, of said holder, and means mounting said position-determining means for movement horizontally and vertically and about an axis parallel to said vertical axis for taking stereoscopic X-ray pictures.

8. Radiographic angulating apparatus comprising means for releasably holding the subject's head in fixed position, a support including a member mounted for turning movement about a horizontal axis and about a vertical axis, an X-ray plate or film holder carried by said member and adjustable thereby to various positions upon movement of said member, means for determining the position of an X-ray projector in relation to the X-ray plate and to the subject's head and movable by said member to various positions corresponding to the positions of the X-ray plate in said various positions, respectively, of said holder, and means for mounting said position-determining means for angular movement in relation to said plate or film for taking stereoscopic X-ray pictures.

9. Radiographic angulating apparatus comprising means for releasably holding the subject's head in fixed position, a support including a member mounted for turning movement about a horizontal axis and about a vertical axis, an X-ray plate or film holder carried by said member and adjustable thereby to various positions upon movement of said member, means for determining the position of an X-ray projector in relation to the X-ray plate and to the subject's head and movable by said member to various positions corresponding to the positions of the X-ray plate in said various positions, respectively, of said holder, and means for indicating the angular position of said member.

10. Radiographic angulating apparatus comprising a bar movable in a horizontal plane, said bar having a rack, a gear engageable with said rack for moving said bar in said horizontal plane, a second bar adjustably carried by said first bar and movable at right angles to said first bar in a vertical plane, a third bar extending transversely of said second bar, means providing a universal joint between said second and third bars, a holder for an X-ray plate or film, and means carried by said third bar for supporting said holder.

11. Radiographic angulating apparatus comprising a bar movable in a horizontal plane, said bar having a rack, a gear engageable with said rack for moving said bar in said horizontal plane, a second bar adjustably carried by said first bar and movable at right angles to said first bar in a vertical plane, a third bar extending transversely of said second bar, means providing a universal joint between said second and third bars, a holder for an X-ray plate or film, means carried by said third bar for supporting said holder at one side of said universal joint, determining the position of means for an X-ray projector, and means carried by said third bar for supporting said positioning means at the opposite side of said universal joint.

12. Radiographic angulating apparatus comprising a bar movable in a horizontal plane, said bar having a rack, a gear engageable with said rack for moving said bar in said horizontal plane, a second bar carried by said first bar and movable at right angles to said first bar in a vertical plane, a third bar extending transversely of said second bar, means providing a universal joint between said second and third bars, a holder for an X-ray plate or film, means carried by said third bar for supporting said holder at one side of said universal joint, positioning means for an X-ray projector, and means carried by said third bar for supporting said positioning means at the opposite side of said universal joint, said last mentioned supporting means comprising companion racks and gears for moving said positioning means vertically and horizontally in a plane parallel to the plane of the X-ray plate or film.

13. The method of radiographing the tempero-mandibular joint of a subject which comprises positioning an X-ray plate or film in a plane determined by the gonion, the high point of the zygoma, and the point where the external oblique line of the mandible meets the lower border of the mandible of the subject, and projecting the X-ray centrally through the area to be radiographed and at right angles to said X-ray plate in said position thereof in exposing said plate for taking the X-ray picture.

14. Radiographic apparatus comprising means for releasably holding the subject's head in a fixed position, a holder for an X-ray film or plate, means mounting said holder for movement thereof about two axes at right angles to each other to various positions for adjustment in relation to the subject's head in the fixed position thereof, and a member for determining the position of an X-ray projector means carried by a part of said mounting means for supporting said position-indicating member for movement about said two axes simultaneously with the movement of said plate-holder, said holder and member being mounted at opposite sides of said head-holding means, said holder and said position-determining member being movable as a unit vertically and horizontally.

15. Radiographic apparatus comprising means for releasably holding the subject's head in a fixed position, a holder for an X-ray film or plate, means mounting said holder for movement thereof about two axes at right angles to each other to various positions for adjustment in relation to the subject's head in the fixed position thereof, a member positioned parallel to the plane of said holder for determining the position of an X-ray projector, means carried by a part of said mounting means for supporting said position-indicating member for movement about said two axes simultaneously with the movement of said plate-holder, said holder and member being mounted at opposite sides of said head-holding means, said part of said mounting means providing a connection between said holder and said member whereby movement of said holder to any one of said positions causes movement of said member to a definite position in relation to said holder in a plane parallel to said holder.

16. Radiographic apparatus comprising a holder for an X-ray plate or film, means for supporting said holder and for adjusting the same in relation to the part to be radiographed, said supporting and adjusting means comprising a bar mounted for pivotal movement about two axes at right angles to each other and a member carrying said holder mounted on said bar and movable longitudinally thereof, a planar member for determining the position of an X-ray projector, and means carried by said bar for supporting said position-indicating member in predetermined relation to said holder.

17. Radiographic apparatus comprising a holder for an X-ray plate or film, means for supporting said holder and for adjusting the same in relation to the part to be radiographed, said supporting and adjusting means comprising a bar mounted for pivotal movement about two axes at right angles to each other and a member carrying said holder mounted on said bar and movable longitudinally thereof, a planar member for determining the position of an X-ray projector, means carried by said bar for supporting said position-indicating member in predetermined relation to said holder, means for holding the part to be radiographed in fixed position, and aligning means carried by said bar for aiding the positioning of said part to be radiographed.

18. Radiographic angulating apparatus comprising means for releasably holding the subject's head in fixed position, a support including a member mounted for turning movement about a horizontal axis and about a vertical axis, an X-ray plate or film holder carried by said member and adjustable thereby to various positions upon movement of said member, means for determining the position of an X-ray projector in relation to the X-ray plate and to the subject's head and movable by said member to various positions corresponding to the positions of the X-ray plate in said various positions, respectively, of said holder, and means for mounting said position-determining means for movement horizontally and for angular movement in relation to said plate or film for taking stereoscopic X-ray pictures.

MAYER B. A. SCHIER.